March 8, 1955  J. WELLER  2,703,593
WOODCUTTING SAW
Filed July 21, 1950   2 Sheets-Sheet 1
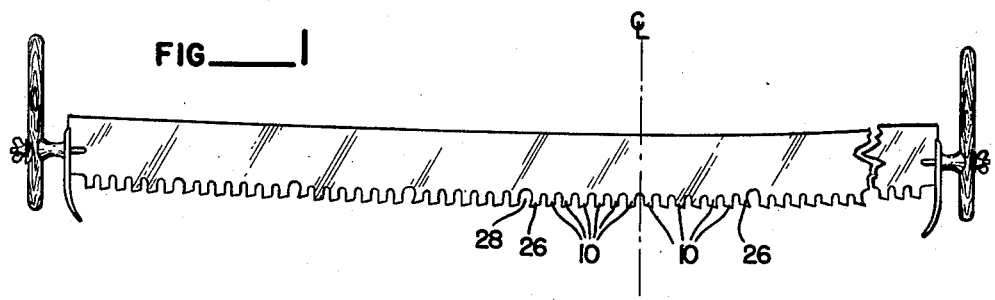
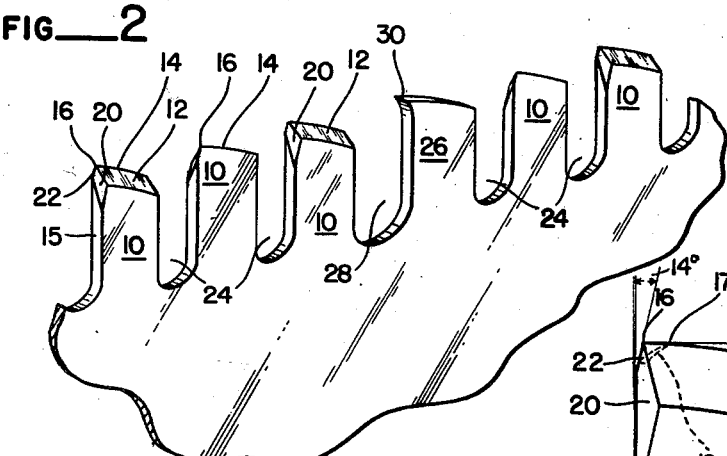
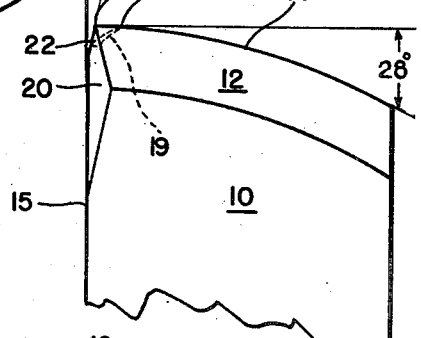
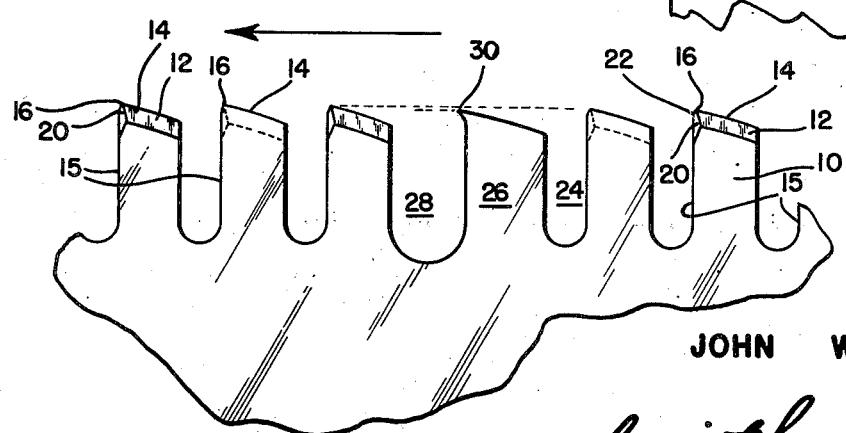
JOHN WELLER
Inventor March 8, 1955
J. WELLER
2,703,593
WOODCUTTING SAW
Filed July 21, 1950
2 Sheets-Sheet 2
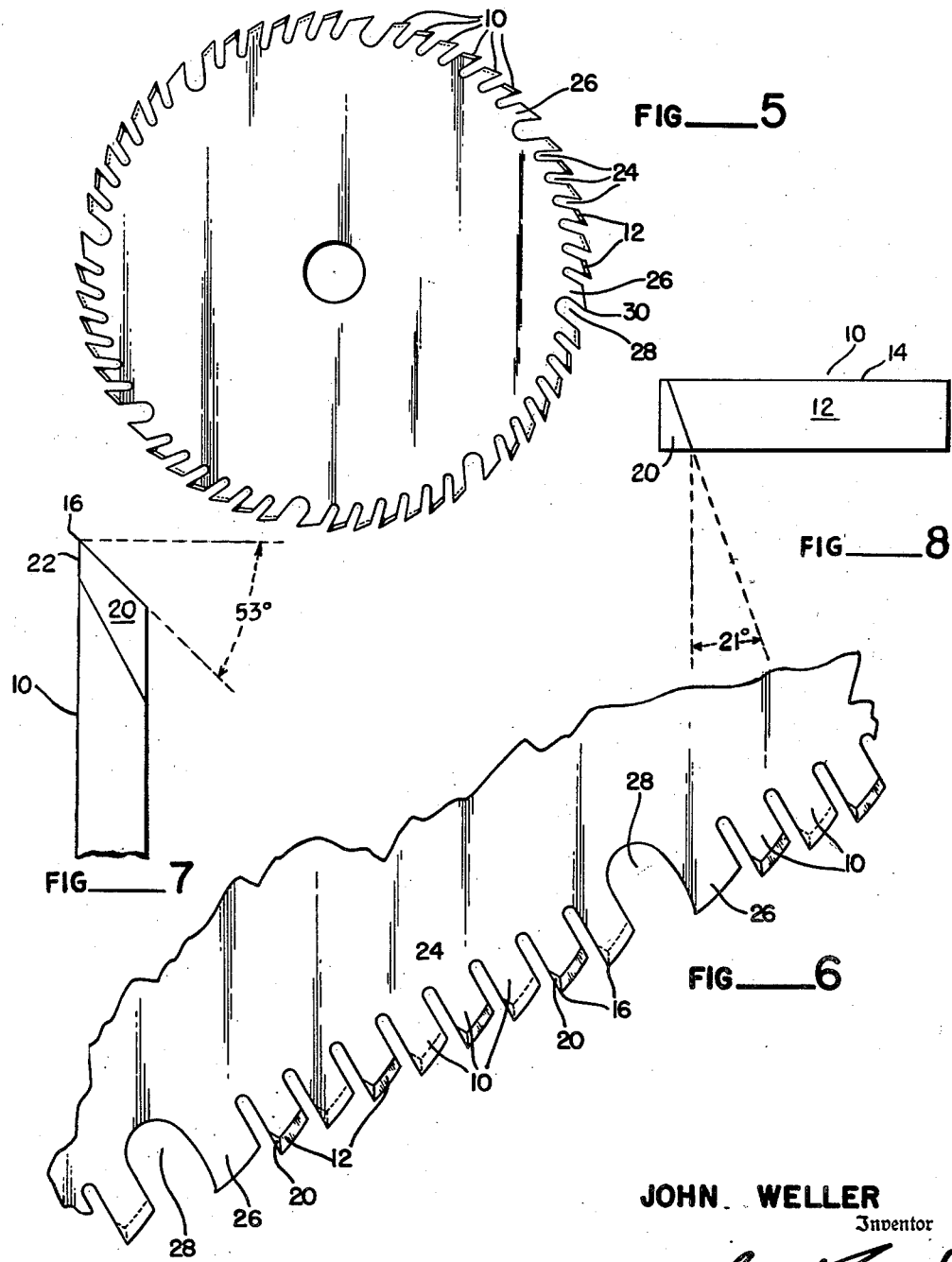
JOHN WELLER
Inventor
By Smith & Tuck
Attorneys of United States Patent Office 2,703,593
Patented Mar. 8, 1955

2,703,593

WOODCUTTING SAW

John Weller, Poulsbo, Wash.; Vivian Weller, administratrix to John Weller, deceased Application July 21, 1950, Serial No. 175,135

1 Claim. (Cl. 143—133)

My present invention is limited to saws intended for cutting wood and consists essentially in providing a plurality of oppositely faced alternate cutting teeth which are filed in a particular manner to greatly increase their cutting ability and to prolong the cutting life between filings. Associated with my improved cutting teeth are single acting rakers each having one chip pocket only. This arrangement of rakers and the particular manner in which the teeth are filed means that in using this form of tooth on various types of saws it can only be used to cut while the teeth are moving in one direction. This limitation does not affect sawing with the ordinary hand saws, circular saws, buck saws and the like. However, when this form of tooth arrangement is used on the crosscut saws, normally intended for a two man operation, it is then necessary to dispose the cutting teeth and rakers oppositely on each side of the center line of the saw. This latter arrangement of the teeth on crosscut saws for the use of bucking or falling is not new but the particular form of teeth forming the essence of this invention lend themselves especially to this form of arrangement.

Woodcutting saws have been in use for a long period and many inventors have, at times, endeavored to improve upon the original filing plans. Some of these plans meet very well certain special considerations or conditions but none of them, as observed, have made any really worthwhile improvements in the cutting speed, the ease of cutting, or in producing a fine finished surface. In this present invention a new form of cutting tooth has been provided. The tooth form gives great structural strength and the cutting point instead of being a sharp V, which is common in practically all forms of filing as observed, has been extended so that, in effect, the cutting tooth is much like that of a chisel used with a sidewise stroke. Consequently, if the keen sharp corner which first meets the wood becomes dulled or rounded the cutting is still achieved by the sharp edge of the tooth immediately adjacent to that portion that has been rounded off. In this way, the extended length of the cutting portion of the tooth prevents any material reduction of the cutting efficiency of the tooth and because of this feature the saw acts as a keen saw for a much longer period. This is a matter of considerable concern to those persons who use saws a great deal, in that one filing lasts for several times the normal use of a conventional saw; the work finished is smooth and the effort to operate the saw still is on a par with a keen, freshly sharpened saw of conventional style. It has further been found that by having an extended cutting edge on the cutting teeth and sharpening the leading adjacent tooth face that the walls of the saw kerf are cut very smoothly so that the end grain cut, which in the past has proved quite a problem, can now be finished by the saw so smoothly, that, for most uses planing need not be resorted to.

The principal object of this invention therefore is to provide a new form and arrangement of teeth for wood cutting saws.

A further object of this invention is to provide a cutting tooth for wood saws in which no sharp cutting corner is expected to carry the cutting load, but rather the cutting edge of the tooth has a long face so that it can be depended upon to remain keen for long periods of use.

A further object of this invention is to provide a cutting edge on wood saw teeth so arranged as to finish the walls of the saw kerf in a very smooth manner.

A further object of this present invention is to provide an arrangement of saw teeth designed to cut effectively and with maximum efficiency in one direction rather than attempt to make a compromise filing that does not function well in either direction.

A further object of this invention is to provide raker teeth having a single chip receiving pocket to the end that a maximum number of cutting teeth can be employed on the saw's face.

A further object of this invention is to provide an arrangement of saw teeth for wood saws which can be oppositely disposed on each end in long two-man saws, so that the effort of the individual sawyer is expended on a cutting arrangement that is designed for maximum utility of his individual effort.

Further objects, advantages and capabilities will be apparent from the description and disclosure in the drawings, or may be comprehended or are inherent in the device.

In the drawings:

Figure 1 is a side elevation of a typical cross-cut saw employing the tooth form of this invention. The same is broken at one point so as to permit an enlarged showing of the essential elements;

Figure 2 is a fragmentary elevation of a group of saw teeth made after the teachings of this present invention;

Figure 3 is a side elevational view, fragmentary and enlarged, showing the upper portion of a cutting tooth;

Figure 4 is a perspective view showing substantially the same teeth as shown in Figure 2 but illustrating, from a different angle of view, the form of the teeth;

Figure 5 is a face view of a circular wood saw employing the teeth of this invention;

Figure 6 is a fragmentary face view showing the tooth arrangement best adapted to hand saws or to band saw blades;

Figure 7 is an elevational view of the end face of a cutting tooth; and

Figure 8 is a top view of a cutting tooth.

Referring more particularly to the disclosure in the drawings, the numeral 10 designates the body of a typical tooth dressed for cutting. These teeth are formed much after the fashion of the usual crosscut saw teeth in that they are rectangular in cross-section throughout the major portion of the body and have considerable length.

In distinction to the usual form of crosscut saw tooth, however, the principal filing or dressing of the tooth produces the longitudinally arcuate surface 12, terminating on one side in the upstanding sharpened top edge 14. The end face of the cutting tooth falls away slowly from sharpened end edge 14 as it extends transversely to the other side whereby the sharpened end edge forms an angle of approximately 53 degrees with the other side. A tangent to sharpened end edge 14 adjacent the rear edge face of the tooth forms an angle of approximately 28 degrees to the line connecting the outermost tips of the cutting teeth. The high point of sharpened top edge 14 occurs at 16, at the joinder of the cutting end 15 of the tooth, and then the cutting edge curves downward slightly toward the body of the saw as it extends away from cutting end 15. The tooth is further dressed by a filing which produces a forward edge face surface 20 which is beveled slightly at approximately 21 degrees with relation to normal to the plane of the cut of the saw. Part of the purpose of this filing is to produce a keen cutting point 16. This dressing has a further function in that it produces a short sharpened edge 22 of surface 20 immediately below and joining with sharpened top edge 14 at point 16, sharpened leading cutting edge 22 being on the leading side of the bevel of surface 20 and being tilted back slightly at approximately 14 degrees from normal to the line connecting points 16 of teeth 10.

The cutting edge of the saw is preferably formed by employing six teeth 10, which may be termed the cutting teeth as they cut the margins of the kerf and in order to achieve the cutting of the opposite sides of the kerf the teeth follow the usual practice in being alternately faced. The various cutting teeth are spaced by the usual sawdust collecting throats or spaces 24. Disposed to coact with each group of cutting teeth is a single faced raker 26. This raker operates in one direction only, namely, the same as the cutting teeth are arranged to work in, and that will require a movement of the saw as seen in Figures 2 and 3 from right to left which has been indicated by the arrow of Figure 2. Preceding each raker 26 is an enlarged sawdust space or pocket 28. This is to give ample space for the collection of ribbons which quite often are removed by the raker teeth from the bottom of the saw kerf. Rakers 26 follow conventional design in that their leading or cutting point 30 is disposed toward the body of the saw from the line of the cutting teeth 10 and normally it is swedged outwardly and dressed at right angles to the body of the saw. This form of raker differs only from the conventional in that it has only one cutting edge.

In Figures 5 and 6 are shown typical tooth arrangements which have been somewhat modified in keeping with the experience of using this tooth plan on different types of saws. In Figure 5 the preferred arrangement of teeth is indicated for circular saws. In Figure 6 the tooth arrangement is shown, with eight cutting teeth 10 in a group, which has been found best for use with thin type saws such as are used in the ordinary carpenters handsaws, or in band-saws where the relative thickness of the material to the width of the saw is much thinner than in the usual two-man saw, as illustrated in Figures 1, 2 and 3.

The function of the saw teeth, using my present plan, is quite similar to the conventional saws of similar types in that the alternately disposed cutting teeth present the cutting points 16 which score and cut the kerf ribbons on each side of the depth of this cut increases with each advancing tooth of the group. Six such teeth have been illustrated in a group and normally they will each take a correspondingly deeper cut as the preceding teeth cut away the wood and make it possible for the following teeth to cut further into the kerf. After the six cutting teeth have passed a point in the kerf, the raker teeth 26, which are chisel cut or chisel faced, cut out the ribbon of wood that has been marginally freed by the cutting teeth. This ribbon is carried out of the saw curve by pockets 28 immediately preceding the rakers and in the same manner the sawdust formed by the cutting teeth is carried out by the sawdust pockets 24, which are disposed on each side of the cutting teeth. On the return, or non-working stroke of the saw, the only surfaces that will be in contact with the wood will be the sharpened top edge 14, thus only a scoring of the kerf ribbon will be achieved by that edge and the saw will run free with no tendency to chatter or to in any way disturb the smooth sidewalls produced in the kerf by the working stroke. The convexly curved outline of sharpened top edge 14 presented on the return stroke provides a minimum of resistance to movement as distinguished from the sharp points presented by many saws on the return stroke. This condition means that the user of the saw is not required to spend any energy in waste effort, and it further means that the planing effect caused by the sharpened edge 22 dressing the kerf walls will not be disturbed and the kerf in the finally cut wood will be clean and smooth. The slight angle presented by sharpened edge 14 on the back stroke helps produce a smooth planing effect. This is a matter of considerable importance to carpenters in doing finish work and has been found to be very important in the framing of heavy timbers, as in bridges and the like, where accurate cuts are required, and where the work of dressing the surfaces smooth would be difficult and would definitely add to the difficulties of working to exact dimensions.

Attention is invited to the fact that with the arrangement of the teeth indicated throughout the accompanying drawings the maximum number of cutting points are provided for a given length of toothed face, and saws for various purposes, made after the teachings of this invention will cut very fast, yet due to the fact that there is no drag on the return stroke of the saw, the over-all work required to operate the same, has been materially reduced over the saws with the conventional type of teeth. Surface 20 being only slightly beveled with relation to the plane of the cut of the saw and leading cutting edge 22 being almost normal to the line connecting cutting points 16, my cutting teeth 10 have a decided gouging effect, producing a rapid cut, as compared with the principally scoring action of the usual cutting tooth of a saw. Cutting tooth 10 falls away slowly from top cutting edge 14 as it extends transversely to the other side, while the usual cutting tooth falls away rapidly from the cutting edge in extending transversely to the side. This feature again tends to produce more of a gouging effect in cutting. Cutting edge 22 being short, a limit is formed for the gouging action of each tooth; and, as only a shallow gouge is made the sides of the kerf are cut smoothly as the shearing is gradual. It will be apparent that if the extreme cutting corner 16 should become slightly rounded or chipped, the portion, as 17, of top cutting edge 14 immediately behind corner 16 becomes the leading cutting point. In Figure 3, dotted line 19 depicts tooth 10 when cutting corner 16 becomes eroded and portion 17 becomes the cutting corner, this eroded portion being somewhat exaggerated for clarity of illustration. In many saws, once the cutting point is eroded, there is not another portion available, to take over the cutting function as the portion of the tooth behind the cutting point falls away too rapidly. Top cutting edge 14 falls away quite slowly behind corner 16 so portion 17 of comparable height behind corner 16 is available as a cutting point when corner 16 becomes dulled, which means that the saw can be used for several times as long without sharpening as the conventional arrangement. It is noted that top cutting edge 14 could be formed in a straight line with a slight slope instead of having a convexly curved outline, even though the latter is the preferred arrangement for minimum of resistance on the return stroke.

It is believed that it will be clearly apparent from the above description and the disclosure in the drawings that the invention comprehends a novel construction of a woodcutting saw.

Having thus disclosed the invention, I claim:

In a wood-cutting saw, the improvement in the cutting teeth, comprising: each cutting tooth having a sharpened end edge at one side, some of the cutting teeth having their sharpened end edges at one side and the other of the cutting teeth having their sharpened end edges on the other side, the end face of the cutting tooth falling away slowly from said sharpened end edge as it extends transversely to the other side whereby said sharpened end edge forms an angle of substantially 53 degrees with the other side; the forward edge face of the cutting tooth having its outer end portion beveled at substantially 21 degrees with relation to normal to the plane of the cut of the saw, the edge of said forward edge face which intersects said sharpened end edge being on the leading side of the bevel and forming a leading cutting edge, said leading cutting edge being tilted back substantially 14 degrees from a normal to the line connecting the outermost tips of the cutting teeth; and said sharpened end edge falling away slowly as it extends away from its joinder with the sharpened edge of said forward end, said sharpened end edge having a convexly curved outline in side elevation so that a tangent to said sharpened end edge adjacent the rear edge face forms an angle of substantially 28 degrees to the line connecting the outermost tips of the cutting teeth.

References Cited in the file of this patent

UNITED STATES PATENTS

| | | |
|---|---|---|
| 542,856 | Johnson | July 16, 1895 |
| 848,842 | McKam | Apr. 2, 1907 |
| 1,771,722 | Crenice | July 29, 1930 |
| 2,023,726 | Emery | Dec. 10, 1935 |
| 2,304,693 | Johnson | Dec. 8, 1942 |